United States Patent

Heininger

[11] 3,914,062
[45] Oct. 21, 1975

[54] WELDED CORNER CONSTRUCTION

[75] Inventor: Richard T. Heininger, Gardner, Mass.

[73] Assignee: Gem Industries, Inc., Gardner, Mass.

[22] Filed: July 30, 1974

[21] Appl. No.: 493,176

[52] U.S. Cl. ............... 403/231; 52/758 H; 52/657; 52/475; 403/272
[51] Int. Cl.² .......................................... B25G 3/00
[58] Field of Search ........... 403/231, 190, 266, 267, 403/270, 271, 272, 401, 406; 52/758 H, 656, 657, 475

[56] References Cited
UNITED STATES PATENTS

| 230,438 | 7/1880 | Porter | 403/231 |
|---|---|---|---|
| 1,161,432 | 11/1915 | Wolf | 403/231 X |
| 2,141,107 | 12/1938 | Greulich | 403/272 X |
| 2,473,217 | 6/1949 | Peoples | 403/231 X |
| 2,661,822 | 12/1953 | Wisok | 403/231 X |
| 2,867,302 | 1/1959 | Miller | 52/656 X |

FOREIGN PATENTS OR APPLICATIONS

| 1,908,911 | 9/1970 | Germany | 403/405 |
|---|---|---|---|
| 606,303 | 7/1960 | Italy | 52/475 |

*Primary Examiner*—Thomas F. Callaghan
*Assistant Examiner*—Wayne L. Shedd
*Attorney, Agent, or Firm*—Charles R. Fay

[57] ABSTRACT

A welded corner construction for e.g., an assembled open frame comprising end and side members, e.g., angle-irons, said corner including a bracket comprising a pair of generally flat plates in general triangular form. The plates are welded together by means of welding projections which enter slots in the ends of each angle iron. In a modification, there is an upstanding flange on one of said plates at the exterior surfaces of said angle-irons, said flange covering the corner rendering the same rounded.

5 Claims, 6 Drawing Figures

WELDED CORNER CONSTRUCTION

BACKGROUND OF THE INVENTION

In the manufacture of certain open rectangular frames, e.g., for bed springs, they are normally made of angle irons riveted together at the corners. This is a relatively inexpensive method of making such frames but requires heavy work on the part of the operator, and also the corners formed are open or sharp, forming edges which may cause injury particularly when the frames are used as spring supports for infants cribs.

SUMMARY OF THE INVENTION

The angle irons of the present invention are seated in spaced portions, at right angles to each other, on a bracket which comprises a pair of flat parallel plates welded together. When these angle irons have been thrust home as far as possible, i.e., abutting each other, the flat plates are welded to the certain flanges of the angle irons and thus form a corner construction permanently secured together. This forms an easily assembled welded frame which can be assembled in a fixture, making much lighter work than the prior art riveted flange.

One of the flat plates may be given a turned-up flange of the height of the upstanding flanges of the angle irons, concealing and protecting the corner by a rounded area.

PREFERRED EMBODIMENTS OF THE INVENTION

Figure 1:
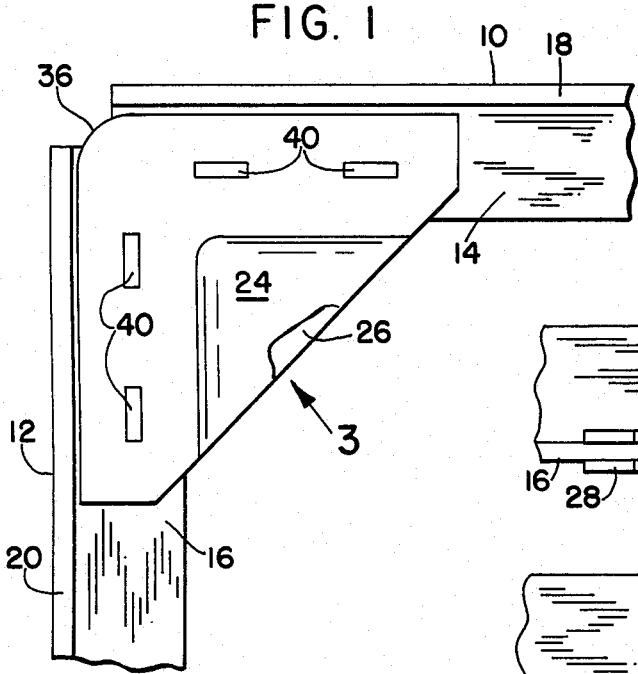
FIG. 1 is a plan view illustrating one form of the invention.
Figure 3:
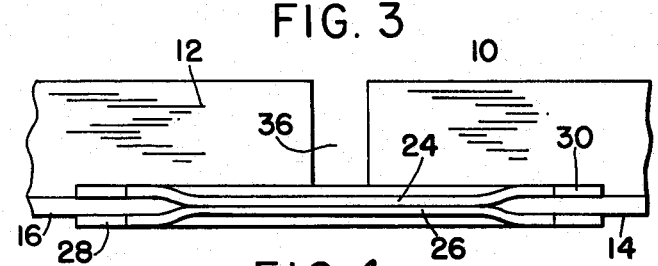
FIG. 3 is a view looking in the direction of arrow 3 in FIG. 1.
Figure 4:
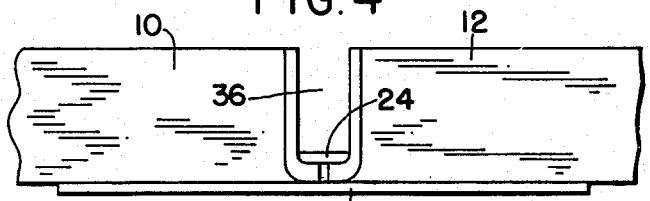
FIG. 4 is a view looking in the direction of arrow 4 in FIG. 2.
Figure 2:
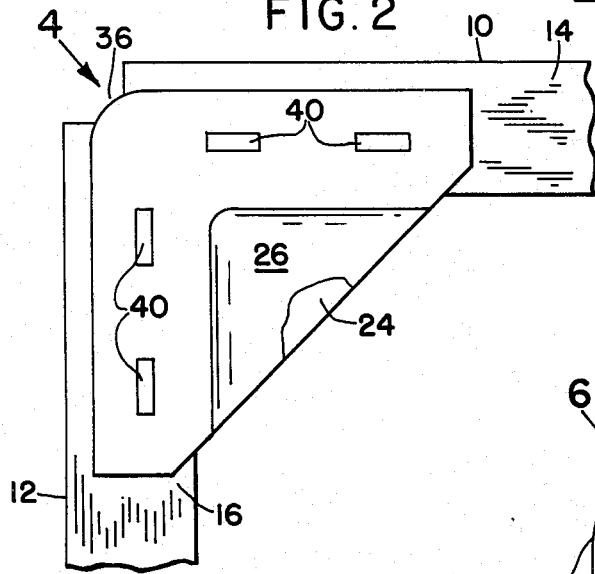
FIG. 2 is a bottom plan view thereof.

The numerals 10 and 12 indicate a pair of angle irons located at right angles with respect to each other each having horizontal flanges 14 or 16 and vertical flanges 18 and 20.

A pair of generally flat triangular plates 24 and 26 are welded together in certain areas thereof, but in other areas 28 and 30 they are spread apart to receive the horizontal flanges 14 and 16 respectively of the angle irons. These angle irons are inserted as far as possible but however leaving a gap between the ends thereof as at 36.

The areas at 40, 40 are then welded together.

Figure 5:
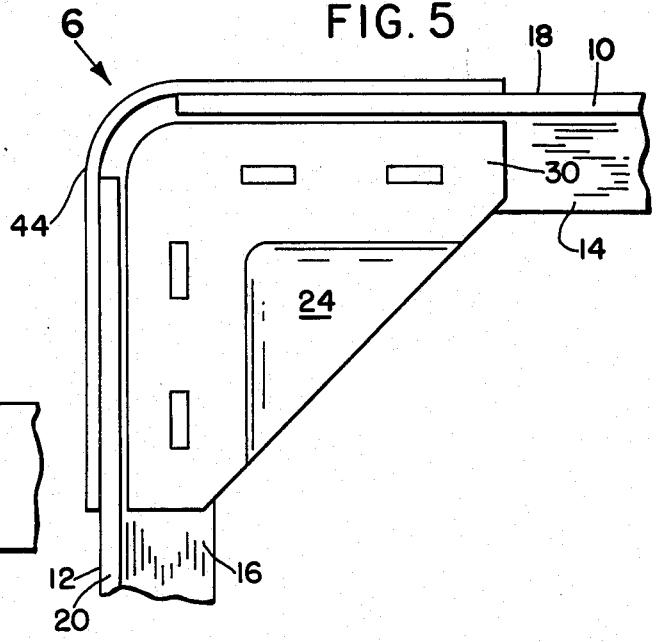
FIG. 5 is a view similar to FIG. 1 showing a modification.
Figure 6:
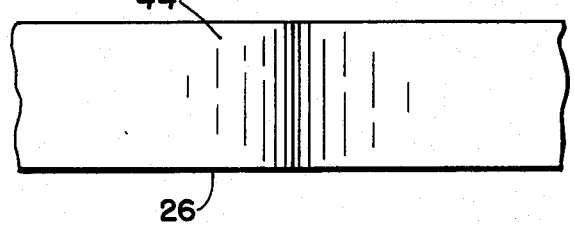
FIG. 6 is a view similar to FIG. 4 but looking in the direction of arrow 6 in FIG. 5.

In order to make the construction stronger and to avoid the sharp edges forming the gap 36, the lower plate 26 may be provided with an upstanding flange as at 44 which is continuous from end to end thereof, see FIGS. 5 and 6. Otherwise the construction is the same as before. The flange 44 is centrally curved and protects and conceals the gap 36.

The numerals 40, 40 may represent detents struck up from flanges 14 and 16 and snapped into conforming holes in the plates 24 or 26, thereby forming interlocks and locating means.

I claim:

1. Corner construction for an open frame utilizing angle irons for the sides and ends thereof, said corner construction comprising a pair of plates welded in part flatwise together, said plates being in the form of triangles, spaced portions on said plates at intersecting edges thereof in unwelded areas of said plates, said spaced portions forming a pair of intersecting channels, the terminal end portions of corresponding flanges of a pair of angle irons being inserted in said channels and the plates being welded to the inserted flanges.

2. The corner construction of claim 1 including a flange on one plate, said flange extending along both of the uninserted flanges of the angle irons.

3. The corner construction of claim 2 wherein the flange on the plate is curved in an area intermediate its ends.

4. The corner construction of claim 3 wherein the curved area of the flange on the plate extends across and covers the area of closest approach of the angle irons.

5. The corner construction of claim 1 including interengaging snap lock means on the plates and on certain portions of the angle irons.

* * * * *